Figure 3:
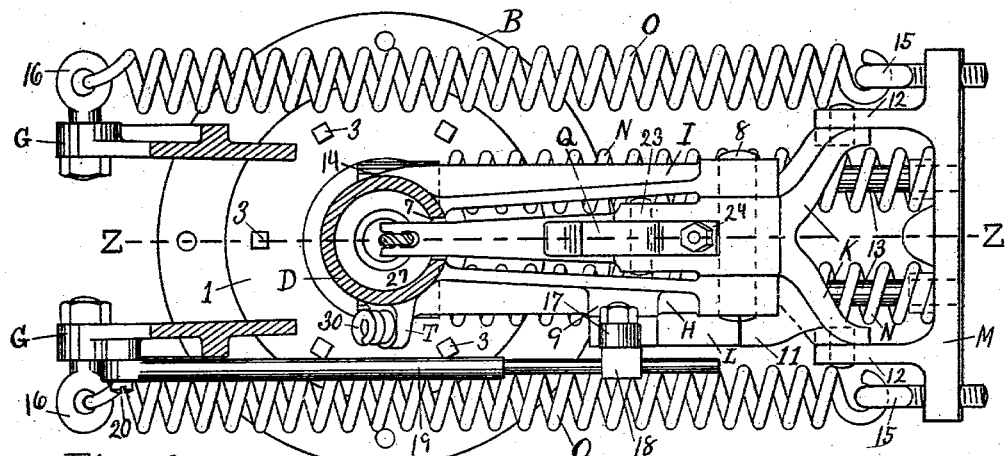

No. 753,345. PATENTED MAR. 1, 1904.
A. C. WOLFE.
AUTOMATIC RELEASING DEVICE FOR SAFETY TROLLEYS.
APPLICATION FILED JULY 6, 1903.
NO MODEL. 2 SHEETS—SHEET 1.
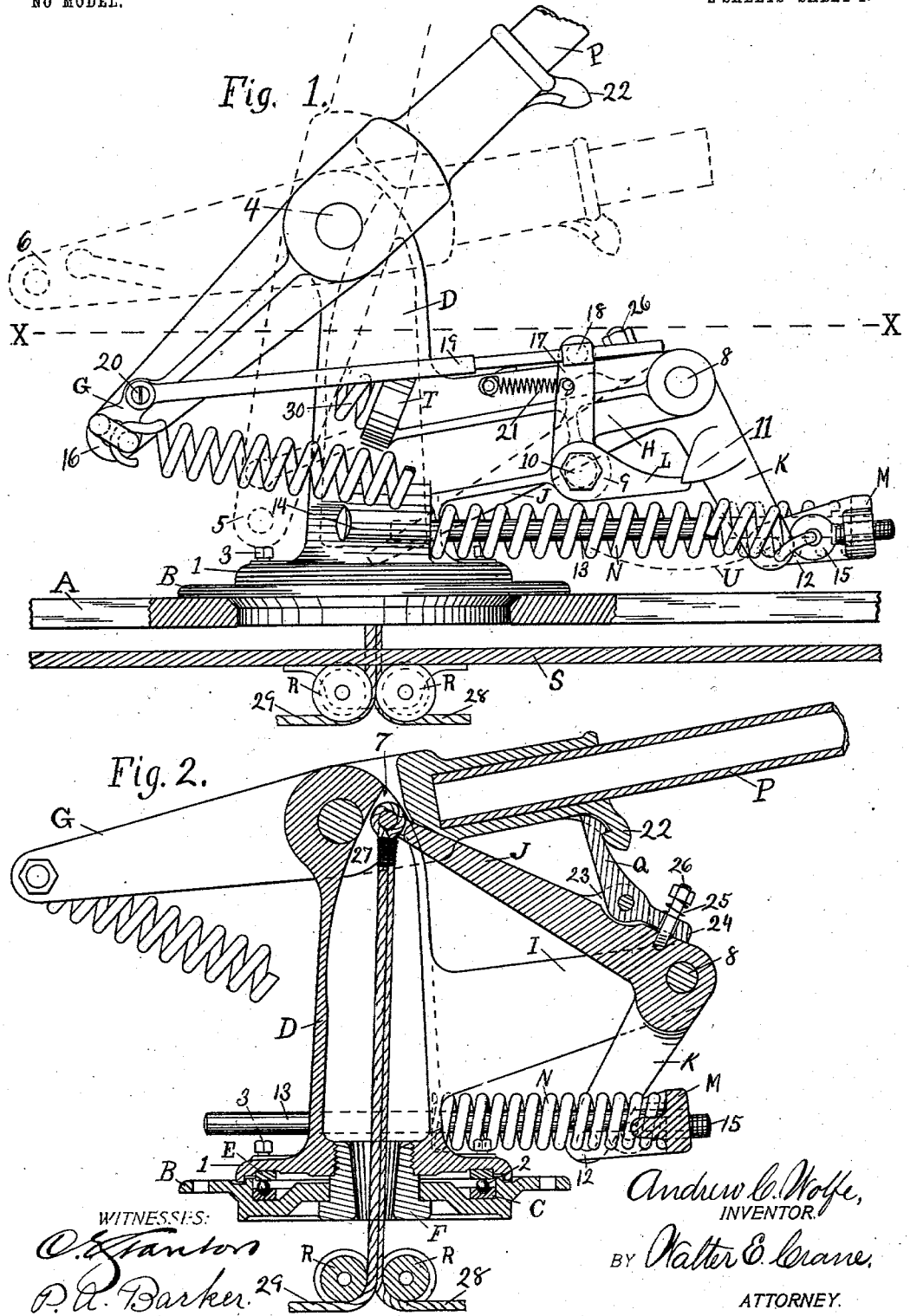

No. 753,345. PATENTED MAR. 1, 1904.
A. C. WOLFE.
AUTOMATIC RELEASING DEVICE FOR SAFETY TROLLEYS.
APPLICATION FILED JULY 6, 1903.
NO MODEL. 2 SHEETS—SHEET 2.

WITNESSES:

INVENTOR.
Andrew C. Wolfe,
BY Walter E. Crane,
ATTORNEY.

No. 753,345.

Patented March 1, 1904.

UNITED STATES PATENT OFFICE.

ANDREW C. WOLFE, OF PITTSBURG, PENNSYLVANIA.

AUTOMATIC RELEASING DEVICE FOR SAFETY-TROLLEYS.

SPECIFICATION forming part of Letters Patent No. 753,345, dated March 1, 1904.

Application filed July 6, 1903. Serial No. 164,372. (No model.)

*To all whom it may concern:*

Be it known that I, ANDREW C. WOLFE, a citizen of the United States, residing at Pittsburg, in the county of Allegheny and State of Pennsylvania, have invented a new and useful Improvement in Automatic Releasing Devices for Safety-Trolleys, of which the following is a specification, reference being had to the accompanying drawings.

This invention relates to self-releasing trolley-bases for use upon electric railways. Its objects are, first, to provide a self-releasing trolley-base which shall automatically lower the pole or let it drop immediately upon the pole leaving the wire; second, to provide a self-releasing trolley-base having tension-springs to raise the trolley-pole and counteracting springs opposing said tension-springs and a connecting spring-bar common to all the springs, the spring-bar being mounted on a swinging support capable of being released; third, to provide a trolley-base in which the supporting-bars for the springs shall be carried by a fork of the returning lever; fourth, to provide a trolley-base in which the movement of the returning-lever shall be substantially vertical with its free end over the center of the swivel of the base; fifth, to provide a trolley-base having short direct rearward-projecting supporting-arms for the returning means; sixth, to provide a trolley-base having a side lug upon the swivel-post and a buffer-spring secured thereto to be engaged by the trolley-fork when the pole attains its highest position; seventh, to provide a trolley-base the swivel of which is provided with a ball-bearing, with the upper ring of said ball-bearing made adjustable; eighth, to provide a trolley-base having a vertically-moving returning-lever provided with a catch to engage a hook of the pole-fork when the same is at its lowest position, the catch being released by the first downward movement of the returning-lever, and, ninth, to provide a releasing trolley-base which has a retaining-pawl to maintain the fork which carries the spring-supporting bar in its working position and disengaging means from the pole-fork to the said pawl.

The above objects are accomplished by means of the mechanism illustrated in the accompanying drawings, in which—

Figure 1 is a side elevation of the trolley-base with its pole represented in mid-position and a portion of the sustaining-springs broken away to better show contiguous parts. The spring-board, to which the base is secured, is represented as broken away to show the under flange of the support for the base. The car-roof is represented in section beneath the spring-board, and the front and rear cord-pulleys are shown under the same. Fig. 2 is a central longitudinal sectional elevation of the trolley-base proper on line Z Z of Fig. 3 and shows same in its released position. This view also shows the front and rear cord-pulleys. Fig. 3 is a plan view of this trolley-base, taken on line X X of Fig. 1.

Similar characters designate like parts in the several views.

The spring-board of the car, upon which the base is secured, is represented by A. A ring base-support B is secured in any desirable manner onto and through the center of this spring-board. A grooved ball-bearing ring C, preferably of hardened steel, is set into the base-support B, so as to be stationary therein. The swivel-post D terminates at its lower end in a flange 1, into which is set a complementary ball-bearing ring E, which is preferably made plain or not grooved for the balls. The balls 2 of the ball-bearing are placed in the groove of ring C in the usual manner, and the ring E rests upon them. A central hollow stud F, preferably provided with a hexagon head and with suitable shoulders, fits through a central opening of the ring support B and is screwed into or otherwise fixedly secured in the lower end of swivel-post D to a shoulder, making the same rigid with said post. This stud F maintains the swivel-post D in a central position. A series of adjusting-screws 3 pass through the flange 1 of the swivel-post, by means of which the ball-ring E may be readily adjusted to prevent undue tipping of the swivel-post D. The trolley-pole fork G is pivotally attached to the top end of swivel-post D, being located astride of said post, and is free to tip upon the pivot 4 from slightly above a horizontal position to nearly a vertical position, as represented by dotted positions 5 and 6. The rear side of the swivel-post D is slotted from the top nearly to the bottom, and at each side of this slot 7 rearward-projecting arms H and I are preferably formed integral with the swivel-post D and have at their rear ends holes in which is inserted the pin 8, upon which is mounted a combined returning-lever J and spring-bar-supporting fork K. The arm H is also provided at its lower edge with a boss 9, to which the retaining-pawl L is pivotally secured by means of the stud 10. The spring-supporting fork K is provided at one side with a lug or projection 11, which is in position and adapted to be engaged by the rear end of the pawl L, as shown in Figs. 1 and 3, by means of which the spring-bar M is maintained in its operative position suitable to extended tension-springs. The spring-bar M is provided with front extensions 12, which are pivotally attached to the lower end of the supporting-fork K. Frontward-extending guide-rods 13 are fixedly secured in the spring-bar M and extend into holes or openings formed in raised bosses 14 at the sides of the lower end of swivel-post D. These rods 13 pass through the counteracting springs N and tend to keep the same approximately straight when they are compressed.

Into the outer end of the spring-bar M are secured adjusting-eyebolts 15, into which are hooked the rear ends of the tension-springs O, the front end of same being hooked into suitable eyebolts 16, secured in the lower extremities of fork G. Upon disengaging the pawl L the tension-springs O immediately move the spring-bar M forward, compressing the counteracting springs, which yield up their force upon returning the spring-bar to its operative position, thereby partially aiding such return by manual force. The disengagement of the pawl L is effected through an upright arm 17, preferably formed integral with the pawl, in the top end of which is pivotally secured a swivel-block 18, through which slides the rear end of a shouldered rod 19, the front end of same being pivotally secured near the lower end of fork G upon the screw 20. A spring 21 tends to move the pawl into its engaging position, as represented in Fig. 1. Upon the trolley-pole P rising under tension of the springs O approximately to the dotted position 5 after leaving the trolley-wire the shoulder of the rod 19 strikes the swivel-block 18, disengaging the pawl L, whereupon the support K, with the spring-bar M, which sustain the tension-springs O, move forward, weakening them sufficiently to let the pole drop, the fork attaining the position represented in Fig. 2 and by dotted-line position 6 in Fig. 1.

The upper end of the pole-fork G is provided with a rigid hook 22, which is engaged when the trolley is released and the pole P attains its lowest position by a catch Q, which is pivotally mounted between ears 23 of the returning-lever J. The catch Q has a rearward extension 24, upon which bears the spring 25, supported by a stud 26, by means of which the catch Q is yieldingly actuated to engage the hook 22. The rearward extension 24 bears at its end upon the surface of the lever J, whereby the positive disengagement of the catch Q is caused at the very first of the lowering movement of the lever J.

The front end of lever J is formed with a central slot and transverse pin portion 27, to which is secured a double cord for returning the lever J to its normal lower position by any desirable means, as by pulling upon the cord by hand within the car or at the rear or front end of the car. The cord is made double, one part, 28, going to the rear and the other part, 29, going to the front of the car, and in so doing they pass about suitable pulleys R, located, preferably, just within the car-roof S and under the center of the swivel-post D.

A lug T, formed, preferably, integral with the swivel-post D and on the side thereof, has secured to it in any desirable manner a short spring 30, which serves the purpose of a buffer to prevent the trolley-pole P from rising too high after leaving the wire. The buffer-spring 30 is struck by the lower edge of pole-fork G when it attains the position represented by dotted lines at 5 in Fig. 1. This buffer-spring 30 tends to rebound the trolley-pole from its highest position and to more quickly throw it to its lower position, (represented by dotted lines at 6 in Fig. 1.)

The forked spring-bar support K when released swings so as to have its pivotal connection with spring-bar M travel through an arc represented by the dotted line U. The guide-rods 13 maintain spring-bar M in approximately the position shown, the rods only lowering a little below their horizontal position during the releasing movement. The spring-bar M is therefore maintained by support K and rods 13 in an appropriate position with reference to tension-springs O and counteracting springs N.

I claim—

1. In an automatic releasing device for safety-trolleys, the combination, with a swivel-post and pivoted pole-fork, of a spring-bar; a pair of tension-springs connecting said fork with said spring-bar; a releasable support for said spring-bar; a pawl engaging said support; and releasing means from said fork to said pawl.

2. In an automatic releasing device for safety-trolleys, the combination, with sustaining-springs and counteracting springs, of a spring-bar connecting said springs; and a releasable spring-bar support.

3. In an automatic releasing device for safety-trolleys, the combination, with a swivel-post having substantially horizontally projecting arms and pivoted pole-fork, of a spring-bar support, pivotally secured in arms of said swivel-post; a spring-bar carried by said spring-bar support; tension-springs from said pole-fork to said spring-bar; a pawl to maintain said spring-bar in its extended position; and disengaging means from said pole-fork to said pawl.

4. In an automatic releasing device for safety-trolleys, the combination, with a swivel-post and pivoted pole-fork, of tension-springs; a spring-bar; counteracting springs; spring-bar guides; supporting means for said spring-bar; and a catch upon said supporting means, in position and adapted to engage said pole-fork and retain it in its lowered position.

5. In an automatic releasing device for trolley-base, the combination with a pivoted pole-fork, of a transverse spring-bar; adjustable eyes in the ends of said spring-bar; tension-springs from said eyes to said pole-fork; counteracting springs pushing against said spring-bar; guide-rods from said spring-bar, extending into openings in the swivel-post; a combined spring-bar support and returning-lever pivoted in arms of said swivel-post; and a retaining-pawl, to sustain said spring-bar support in its operative position.

6. In an automatic releasing device for safety-trolleys, the combination with a swivel-post and pivoted pole-fork, of sustaining-springs; a spring-bar; a releasable spring-bar support; and a buffer-spring on the side of said swivel-post, to engage one arm of said pole-fork.

7. In an automatic releasing device for safety-trolleys, the combination, with a pivoted pole-fork, of a spring-bar; tension-springs from said pole-fork to said spring-bar; counteracting springs pushing against said spring-bar; guide-rods on said spring-bar, passing through said counteracting springs; and a releasable spring-bar support.

8. In an automatic releasing device for safety-trolleys, the combination with a swivel-post and support therefor, of arms on said swivel-post, sustaining at their ends a pin; a combined returning-lever and spring-bar support mounted on said pin; a pawl engaging said spring-bar support; a pivoted pole-fork; disengaging means from said pole-fork to said pawl; a spring-bar carried by said spring-bar support; adjusting-eyes in the end portions of said spring-bar; and tension-springs from said eyes to said pole-fork.

In testimony whereof I affix my signature hereto, at Pittsburg, Pennsylvania, this 11th day of December, 1902, in the presence of two subscribing witnesses.

ANDREW C. WOLFE. [L. S.]

Witnesses:
 E. D. ODENBAUGH,
 C. S. MARSHALL.